United States Patent [19]

Kanome et al.

[11] Patent Number: 4,869,739

[45] Date of Patent: Sep. 26, 1989

[54] FUEL VAPOR COLLECTING DEVICE

[75] Inventors: Yoshihiro Kanome; Fumiyoshi Noda; Takashi Minami, all of Toyota; Etsuo Sugiyama, Ogasa; Yutaka Yamada, Obu, all of Japan

[73] Assignee: Toyota Jidosha Kabushiki Kaisha, Aichi, Japan

[21] Appl. No.: 221,611

[22] Filed: Jul. 20, 1988

[30] Foreign Application Priority Data

Aug. 3, 1987 [JP] Japan ................... 62-192599

[51] Int. Cl.$^4$ ............................................. B01D 53/04
[52] U.S. Cl. ........................................ 55/269; 55/88; 55/387; 123/519
[58] Field of Search ................. 55/269, 387, 74, 88; 123/519–521

[56] References Cited

U.S. PATENT DOCUMENTS

| | | | |
|---|---|---|---|
| 3,264,803 | 8/1966 | Read | 55/269 X |
| 3,296,773 | 1/1967 | Hemstreet | 55/389 X |
| 4,203,401 | 5/1980 | Kingsley et al. | 55/387 X |
| 4,219,341 | 8/1980 | Hussmann | 55/387 X |

FOREIGN PATENT DOCUMENTS

50-59408 6/1975 Japan .
53-77923 7/1978 Japan .
55-149622 11/1980 Japan .

Primary Examiner—Charles Hart
Attorney, Agent, or Firm—Oliff & Berridge

[57] ABSTRACT

A fuel vapor collecting device comprising an activated carbon receiving chamber filled with activated carbon particles. Each of the activated carbon particles contains heat accumulating solid fillers which are uniformly distributed therein. The heat accumulating solid fillers are made of a metallic material having a specific heat which is larger than that of the activated carbon.

10 Claims, 5 Drawing Sheets

FUEL VAPOR COLLECTING DEVICE

BACKGROUND OF THE INVENTION

1. Field of the Invention

The present invention relates to a fuel vapor collecting device for use in a motor vehicle.

2. Description of the Related Art

A fuel vapor collecting device is used to prevent a fuel vapor rom escaping into the outside air. To this end, in a known fuel vapor collecting device using an activated carbon, fuel vapor generated from a fuel system such as a fuel tank is adsorped and temporarily retained in the activated carbon, and when the engine is operating in a predetermined operating state, the fuel vapor adsorped in the activated carbon is desorped by introducing the outside air to the activated carbon, and the fuel vapor thus desorped is fed into the engine cylinders and burned therein.

The fuel vapor adsorption ability of the activated carbon becomes higher as the temperature of the activated carbon becomes lower, and the fuel vapor desorption ability of the activated carbon becomes higher as the temperature of the activated carbon becomes higher. But the adsorption of the fuel vapor by the activated carbon is an oxothermic reaction, and consequently, since the temperature of the activated carbon becomes higher as the adsorption becomes greater, a problem occurs in that the adsorption ability of the activated carbon is gradually lowered. In addition, the desorping of the fuel vapor in the activated carbon is an endothermic reaction and, therefore, since the temperature of the activated carbon becomes lower as the desorping becomes greater, another problem occurs in that the desorption ability of the activated carbon is gradually lowered.

To eliminate these problems, a known fuel vapor collecting device comprises a plurality of fins extending outward beyond the circumferential wall of the activated carbon receiving chamber from the interior of the activated carbon receiving chamber (Japanese Unexamined Patent Publication No. 55-149622). In this fuel vapor collecting device, the adsorping ability and the desorping ability of the activated carbon are improved by discharging the heat generated when the fuel vapor is adsorbed into the outside air through the fins, to suppress an increase in temperature of the activated carbon, and when the fuel vapor is desorped, introducing heat outside of the fuel vapor collecting device into the activated carbon, through the fins, to suppress the reduction in temperature of the activated carbon.

Nevertheless, when the fuel vapor collecting device is provided with a plurality of such fins, a problem occurs in that the size of the fuel vapor collecting device is increased, and in addition, the construction of the fuel vapor collecting device becomes complicated, and thus another problem occurs in that much time and labor are required for the manufacture of the fuel vapor collecting device.

SUMMARY OF THE INVENTION

An object of the present invention is to provide a fuel vapor collecting device capable of easily enhancing the adsorption and desorption ability of the activated carbon.

According to the present invention, there is provided a fuel vapor collecting device comprising: an activated carbon receiving chamber and activated carbon particles contained in the activated carbon receiving chamber, each of the activated carbon particles containing heat accumulating solid fillers distributed therein and having a specific heat which is larger than that of an activated carbon.

The present invention may be more fully understood from the description of a preferred embodiment of the invention set forth below, together with the accompanying drawings.

DESCRIPTION OF A PREFERRED EMBODIMENT

Figure 1:
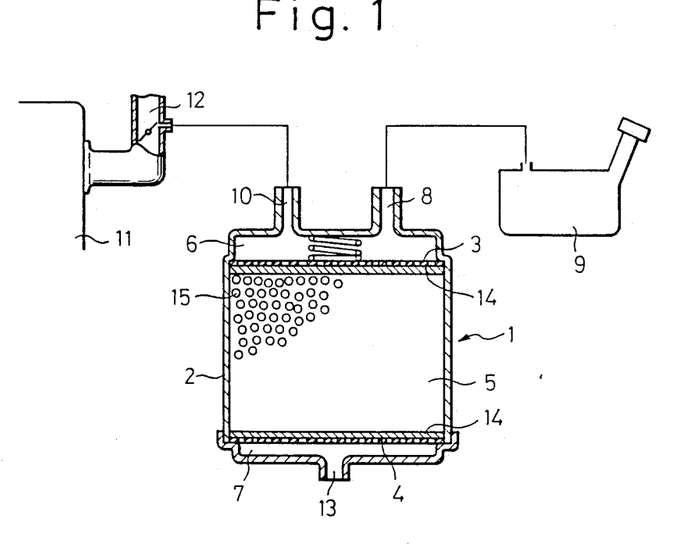
FIG. 1 is a cross-sectional side view of a fuel vapor collecting device.

Referring to FIG. 1, reference numeral 1 designates a fuel vapor collecting device, normally called a charcoal canister. The fuel vapor collecting device 1 comprises a pair of perforated plates 3 and 4 arranged in a casing 2 in such a manner that the interior of the casing 2 is divided into an activated carbon receiving chamber 5, a fuel vapor chamber 6, and an atmospheric chamber 7. The fuel vapor chamber 6 is connected to a fuel tank 9 via a fuel vapor inlet 8, and to an intake passage 12 of an engine 11 via a fuel vapor outlet 10. The atmospheric chamber 7 is open to the outside air via an atmospheric port 13. Filters 14 are arranged in the activated carbon receiving chamber 5 on the inner faces of the perforated plates 3 and 4, respectively, and the space between the filters 14 is filled with an activated carbon 15. When the fuel vapor is to be adsorped, fuel vapor generated in the fuel tank 9 is fed into the fuel vapor chamber 6 via the fuel vapor inlet 8, the fuel vapor is then introduced into the activated carbon receiving chamber 5 and adsorped in the activated carbon 15, and air from which the fuel component has been removed is then discharged into the outside air via the atmospheric port 13. When the fuel vapor is to be desorped, the outside air is introduced into the activated carbon receiving chamber 5 via the atmospheric port 13 and the atmospheric chamber 7, and the fuel vapor adsorped in the activated carbon 15 is desorped. The air containing the fuel component therein is then fed into the intake passage 12 via the fuel vapor chamber 6 and the fuel vapor outlet 10, and the fuel component is burned in the engine cylinders.

As mentioned above, to obtain a high adsorption ability by the activated carbon 15, the temperature of the activated carbon 15 must be kept as low as possible during the adsorption of the fuel vapor. In addition, to obtain a high desorption ability by the activated carbon 15, the temperature of the activated carbon 15 must be kept as high as possible during the desorping of the fuel vapor.

Figure 2:
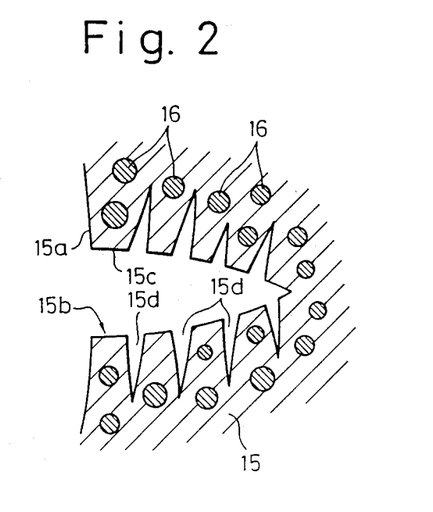
FIG. 2 is an enlarged cross-sectional view of an activated carbon particle.

To obtain a high adsorption and desorption ability by the activated carbon 15, in the present invention, as shown in FIG. 2 which illustrates an enlarged cross-section of a particle of the activated carbon 15, heat accumulating solid fillers 16 are contained in the activated carbon 15. These heat accumulating solid filler 16 are shaped in the form of a particle and have a specific heat which is larger than that of the activated carbon 15. Accordingly, when the heat accumulating solid fillers 16 having a specific heat which is larger than that of the activated carbon 15 are contained in the activated carbon 15, the heat generated during the adsorption of the fuel vapor is accumulated by the heat accumulating solid fillers 16, and therefore, an increase in the overall temperature of the activated carbon 15 including the heat retaining solid fillers 16 is suppressed. In addition, during the desorption of the fuel vapor, the heat accumulated in the heat accumulating solid fillers 16 having a large specific heat is emitted therefrom, and thus a reduction of the overall temperature of the activated carbon 15 including the heat accumulating solid fillers 16 is suppressed. Therefore, by the above process, the adsorption and desorption ability of the activated carbon 15 is enhanced. As schematically illustrated in FIG. 2, a plurality of fine bores 15b are formed in the outer face 15a of the activated carbon 15, and a plurality of extremely fine bores 15d, which are narrower than the fine bores 15b and have a diameter of 10 through 50 Å, are formed in the surface of the fine bores 15b. Therefore, during the adsorption of the fuel vapor, the fuel vapor is drawn into the fine bores 15b by a capillary action and is retained therein. At this time, a part of the fuel vapor is drawn into the extremely fine bores 15d and retained therein.

The heat accumulating solid fillers 16 can be made of various materials, for example, a metallic material such as iron, stainless steel, copper, lead, and the like. Further, the heat accumulating solid fillers 16 may be made of an aluminum oxide, various types of ceramic, a glass, and any other inorganic material. With regard to the shape of the heat accumulating solid fillers 16, a particle shape, a band shape, or a fiber shape can be used.

Next, the method of manufacturing the activated carbon 15 will be hereinafter described with reference to FIG. 3.

Figure 3:
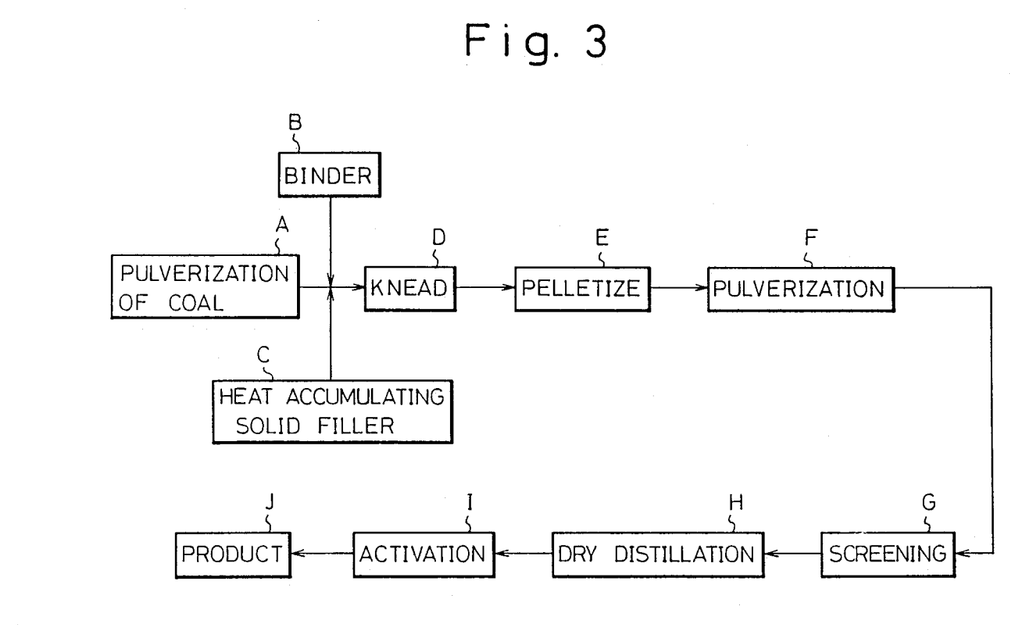
FIG. 3 is a diagram illustrating the process of manufacturing an activated carbon.

Referring to FIG. 3, first coal is pulverized at A, and then a binder (see B) formed of pitch, etc., is added to the pulverized coal together with the heat accumulating solid fillers 16 (see C). Then, at D, the pulverized coal, the binder and the heat accumulating solid fillers 16 are kneaded into a paste and then, at E, the paste is pelletized to form pellets having a diameter of about 4 through 8 mm. Then the pellets are pulverized at F and screened at G, and at H, the screened particles are dry distilled. Note, the fine bores 15b (FIG. 2) are formed at this time. Then, at I, the extremely fine bores 15d (FIG. 2) are formed by activating the particles, and finally, the activated carbon 15 is produced (see J). As mentioned above, in the manufacturing process, since the heat accumulating solid fillers 16 are kneaded together with the pulverized coal and the binder, the heat accumulating solid fillers 16 are uniformly distributed over the entire cross-section of the particle of the activated carbon 15, as illustrated in FIG. 2. The mean value of the diameter of the activated carbon particles is about 1 through 3 mm, and if the heat accumulating solid fillers 16 have a particle shape, preferably the diameter of the heat retaining solid fillers 16 is smaller than 10 percent of the mean value of the diameter of the activated carbon particles.

Next, experimental results obtained by using heat accumulating solid fillers made of strainless steel and having a diameter of 0.1 mm will be hereinafter described.

Figure 4:
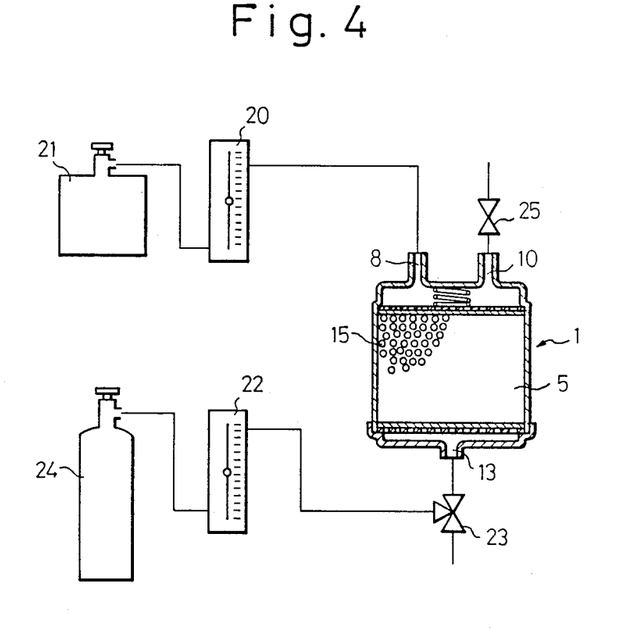
FIG. 4 is a view illustrating experimental equipment for measuring the adsorption ability of the activated carbon.

FIG. 4 illustrates an experimental equipment for measuring the desorption ability of the activated carbon by using n-butane. Referring to FIG. 4, the experimental equipment comprises an n-butane Tank 21 connected to the fuel vapor inlet 8 via a flow meter 20, a compressed air bomb 24 connected to the atmospheric port 13 via a flow meter 22 and a three way valve 23, and a valve 25 connected to the fuel vapor outlet 10.

The experiments were conducted in the following manner. Namely, first n-butane was fed into the activated carbon receiving chamber 5 until the adsorping ability of the activated carbon 15 reached a breakthrough point at which the adsorping ability thereof was lost. At this point, the weight of the fuel vapor collecting device 1 was measured. Then, a predetermined amount of compressed air was fed into the activated carbon receiving chamber 5 to desorp the n-butane from the activated carbon 15, and the weight of the activated carbon collecting device 1 was again measured.

Figure 5:
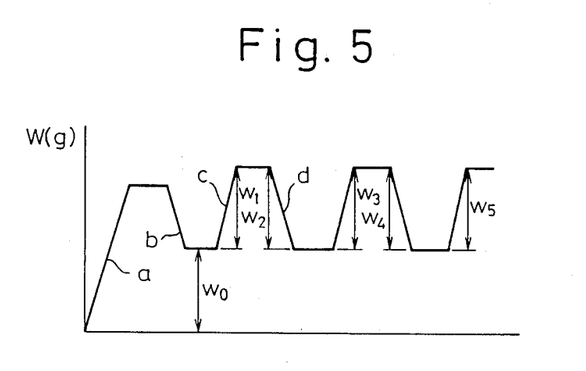
FIG. 5 is a diagram illustrating a change in the weight of the adsorped butane.

FIG. 5 illustrates changes in the weight of the adsorped butane W(g) when the above-mentioned experiments were repeatedly conducted. In FIG. 5, (a) indicates the change of weight W(g) at the time of the first adsorping operation; (b) indicates the change of weight W(g) at the time of the first desorping operation; (c) indicates the change of weight W(g) at the time of the second adsorping operation; and (d) indicates the change of weight W(g) at the time of the second desorping operation. The adsorping operation and desorping operation were then subsequently repeated many times. In FIG. 5, $W_0$ indicates the amount of residual n-butane remaining in the activated carbon 15. Thus, the amount of adsorped n-butane $W_1$, $W_2$, $W_3$, $W_4$, $W_5$ . . . at the time of completion of the adsorping operation after the second adsorping operation and at the time of a start of the desorping operation after the second desorping operation indicates the ability of adsorption for n-butane where the adsorption and the desorption are repeated. Each mean value of $W_1$, $W_2$, $W_3$, $W_4$, $W_5$ . . . represents the butane working capacity (BWC). Consequently, the adsorption ability of the activated carbon 15 becomes high as the BWC becomes greater.

Next, the results of comparison experiments when the heat accumulating solid fillers 16 were not added to the activated carbon 15 and when 3 volume percent of the heat accumulating solid fillers 16 were added to the activated carbon 15 will be described. In these experiments, the activated carbon 15 had a mean diameter of 28 mesh.

When the heat accumulating solid fillers 16 were not added to the activated carbon 15, the BWC was equal to 24.0 (g). Conversely, when the heat accumulating solid fillers 16 were added to the activated carbon 15, the BWC was equal to 25.9 (g). Consequently, it is obvious that the adsorption ability obtained when the heat accumulating solid fillers 16 are added to the activated carbon 15 is high, compared with the case where the heat accumulating solid fillers 16 are not added to the activated carbon 15.

Figure 7:
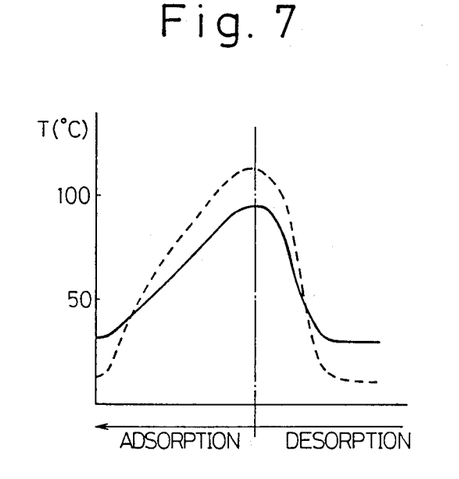
FIG. 7 is a view illustrating a change in temperature of the activated carbon; and, FIG. 8 is a view illustrating the adsorption ability of the activated carbon.

FIG. 7 illustrates a change in temperature of the activated carbon 15 when the adsorping operation and the desorping operation are carried out. In FIG. 7, the broken line indicates the case where the heat accumulating solid fillers 16 are not added to the activated carbon 15, and the solid line indicates the case where the heat accumulating solid fillers 16 are added to the activated carbon 15. From FIG. 7, it will be understood that the temperature of the activated carbon 15 during the adsorping operation in the case where the heat accumulating solid fillers 16 are added to the activated carbon 15 is low, compared with the case where the heat accumulating solid fillers 16 are not added to the activated carbon 15, and that the temperature of the activated carbon 15 during the desorping operation in the case where the heat accumulating solid fillers 16 are added to the activated carbon 15 is high, compared with the case where the heat accumulating solid fillers 16 are not added to the activated carbon 15.

Next, the results of experiments conducted for measuring a change in the BWC in accordance with an elapse of time will be described. In these experiments, the activated carbon 15 used is the same as that used in the experimental equipment illustrated in FIG. 4.

Figure 6:
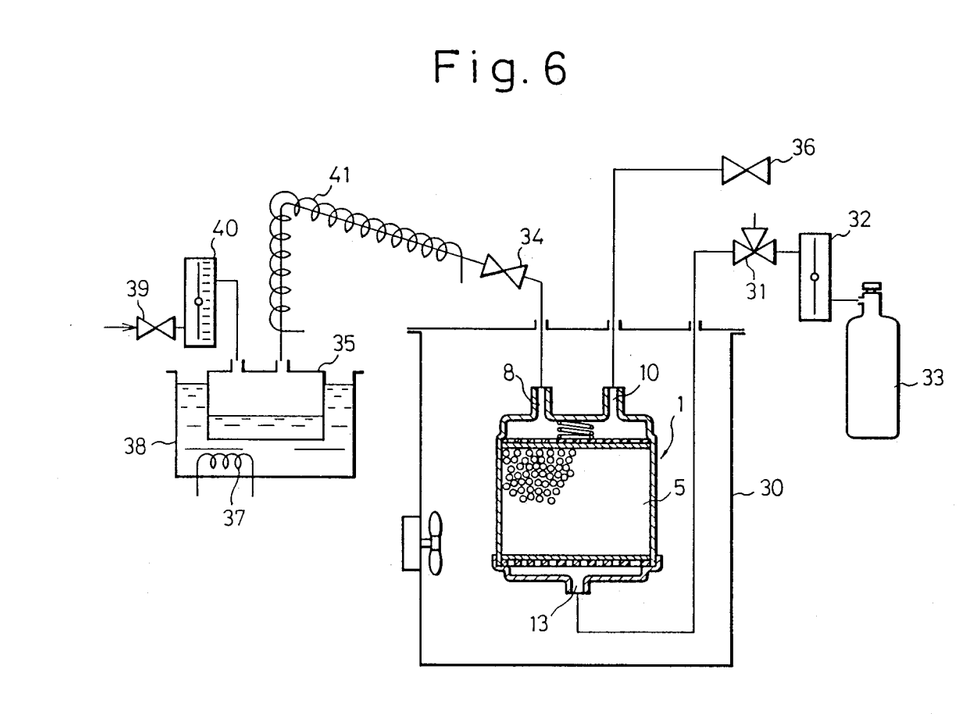
FIG. 6 is a view illustrating experimental equipment for measuring a change in the adsorption ability of the activated carbon in accordance with an elapse of time.

FIG. 6 illustrates an experimental equipment for measuring the reduction ratio S of the BWC in accordance with an elapse of time. Referring to FIG. 6, this experimental equipment comprises a thermostatic oven 30, a compressed air bomb 33 connected to the atmospheric port 13 via a flow meter 32 and a three way valve 31, a gasoline tank 35 connected to the fuel vapor inlet 8 via a valve 34, and a valve 36 connected to the fuel vapor outlet 10. The fuel vapor collecting device 1 is arranged in the thermostatic oven 30. The gasoline tank 35 is arranged in a liquid bath 38 equipped with a heater 37, and gasoline is fed into the gasoline tank 35 via a valve 39 and a flow meter 40. Gasoline vaporized in the gasoline tank 35 is fed into the activated carbon receiving chamber 5 via the valve 34 while being heated by a heater 41.

The experiments were conducted in the following manner. Namely, first a predetermined amount of gasoline vapor (20 g), and then air, was fed into activated carbon receiving chamber 5. This alternating feed of the gasoline vapor and air was repeated one hundred times and, during this time, the BWC was measured. The above-mentioned process was repeated several times.

The results of the experiments were as follows. When the heat accumulating solid fillers 16 were not added to the activated carbon 15, the reduction ratio S of the BWC was 38%, and the amount of residual gasoline vapor remaining in the activated carbon 15 was 100 (g). Conversely, when the heat accumulating solid fillers 16 were added to the activated carbon 15, the reduction ratio S of the BWC was 21%, and the amount of residual gasoline vapor remaining in the activated carbon 15 was 82 (g). From the results of these experiments, it will be understood that, when the heat accumulating solid fillers 16 are added to the activated carbon 15, the reduction ratio S of the BWC is lowered, i.e., the adsorption ability suffers less deterioration compared with the case where the heat accumulating solid fillers 16 are not added to the activated carbon 15. In addition, it will be also understood that, when the heat accumulating solid fillers 16 are added to the activated carbon 15, the amount of residual gasoline vapor remaining in the activated carbon 15 is small compared with the case where the heat accumulating solid fillers 16 are not added to the activated carbon 15.

Figure 8:
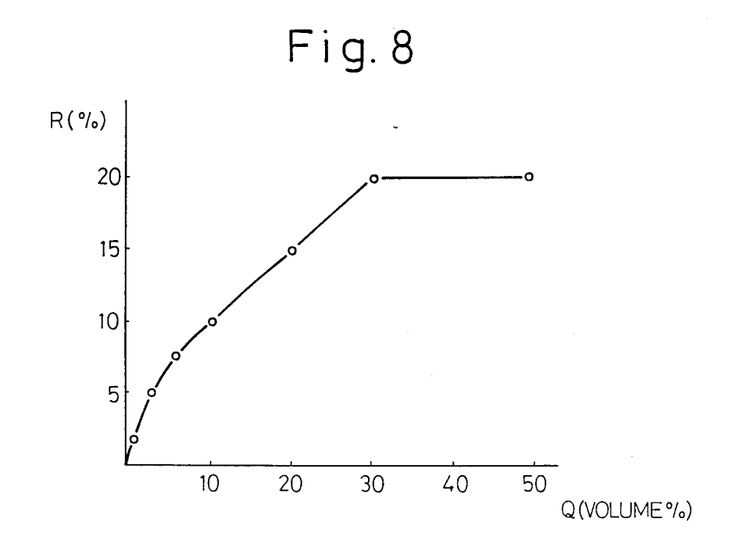

FIG. 8 illustrates the results of experiments when the amount of the heat accumulating solid fillers 16 added to the activated carbon 15 was changed. These experiments were conducted by using the experimental equipment illustrated in FIG. 4. In FIG. 8, the ordinate indicates an increase ratio R(%) of BWC, and the abscissa indicates a ratio of addition Q (volume %) of the heat accumulating solid fillers 16. From FIG. 8, it will be understood that the increase ratio R of the BWC becomes higher as the ratio of the addition Q of the heat accumulating solid fillers 16 is increased. In addition, as can been seen from FIG. 8, the increase ratio R of the BWC reaches a maximum point when the ratio of the addition Q of the heat accumulating solid fillers 16 exceeds 30 volume %. If the ratio of the addition Q of the heat accumulating solid fillers 16 is increased, since the suppression of the increase and reduction in the temperature of the activated carbon 15 by the heat accumulating solid fillers 16 becomes strong, the increase ratio R of the BWC is gradually increased. But, if the ratio of the addition Q of the heat accumulating solid fillers 16 exceeds 30 volume(%), since the amount of the activated carbon 15 itself is decreased, the increase ratio R of the BWC is not increased.

According to the present invention, it is possible to improve the adsorption and desorption ability of the activated carbon by adding the heat accumulating solid fillers to the activated carbon.

While the invention has been described by reference to specific embodiments chosen for purposes of illustration, it should be apparent the numerous modifications could be made thereto by those skilled in the art without departing from the basic concept and scope of the invention.

We claim:

1. A fuel vapor collecting device comprising:
an activated carbon receiving chamber; and
activated carbon particles contained in said activated carbon receiving chamber, each of said activated carbon particles containing heat accumulating solid fillers distributed therein and having a specific heat which is larger than that of said activated carbon.

2. A fuel vapor collecting device according to claim 1, wherein said heat accumulating solid fillers have a particulate shape.

3. A fuel vapor collecting device according to claim 2, wherein said heat accumulating solid fillers have a diameter which is smaller than the mean value of the diameter of said activated carbon particles.

4. A fuel vapor collecting device according to claim 1, wherein said heat accumulating solid fillers are made of a metallic material.

5. A fuel vapor collecting device according to claim 4, wherein said heat accumulating solid fillers are made of one of iron, stainless steel, copper, lead, and aluminum oxide.

6. A fuel vapor collecting device according to claim 1, wherein said heat accumulating solid fillers are made of an inorganic material.

7. A fuel vapor collecting device according to claim 1, wherein more than 3 volume percent of said heat accumulating solid fillers is contained in said activated carbon particles.

8. A fuel vapor collecting device according to claim 7, wherein more than 30 volume percent of said heat accumulating solid fillers is contained in said activated carbon particles.

9. A fuel vapor collecting device according to claim 1, wherein said heat accumulating solid fillers are uniformly distributed over an entire cross-section of said activated carbon particle.

10. A fuel vapor collecting device according to claim 1, further comprising spaced perforated plates forming said activated carbon receiving chamber therebetween; a fuel vapor chamber separated from said activated carbon receiving chamber and having a fuel vapor inlet and a fuel vapor outlet; and an atmospheric chamber separated from said activated carbon receiving chamber and open to the outside air, said actuated carbon receiving chamber being filled with said activated carbon particles.

* * * * *

UNITED STATES PATENT AND TRADEMARK OFFICE
CERTIFICATE OF CORRECTION

PATENT NO. :   4,869,739
DATED      :   September 26, 1989
INVENTOR(S):   Yoshihiro KANOME et al.

It is certified that error appears in the above-identified patent and that said Letters Patent is hereby corrected as shown below:

On the title page:

Item [73] Assignee, should read as follows:

[73] Assignees:   Toyota Jidosha Kabushiki Kaisha, Aichi, Japan; Aisan Industry Co., Ltd., Aichi, Japan and Cataler Industrial Corporation, Ltd., Shizuoka, Japan Signed and Sealed this Twenty-ninth Day of January, 1991

Attest:

HARRY F. MANBECK, JR.

*Attesting Officer*                 *Commissioner of Patents and Trademarks*